3,217,548
AUTOMATIC GRAIN SAMPLING DEVICE WITH CHARACTERIZED SAMPLING TUBE
Ray R. Cordell and Wayne F. Gustafson, Minneapolis, Minn., assignors to Gustafson Manufacturing Company, Minneapolis, Minn.
Filed Nov. 6, 1963, Ser. No. 321,936
11 Claims. (Cl. 73—422)

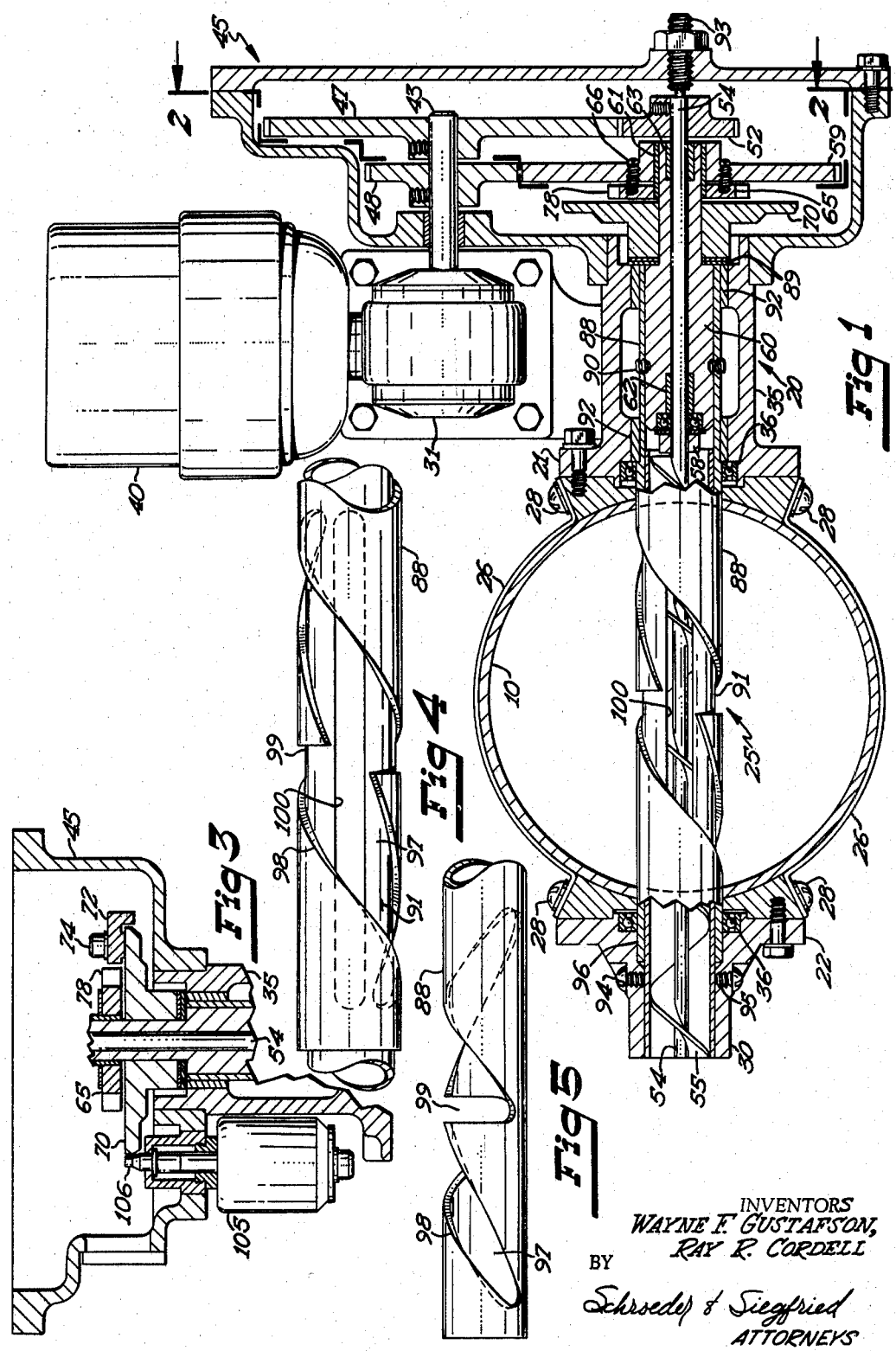

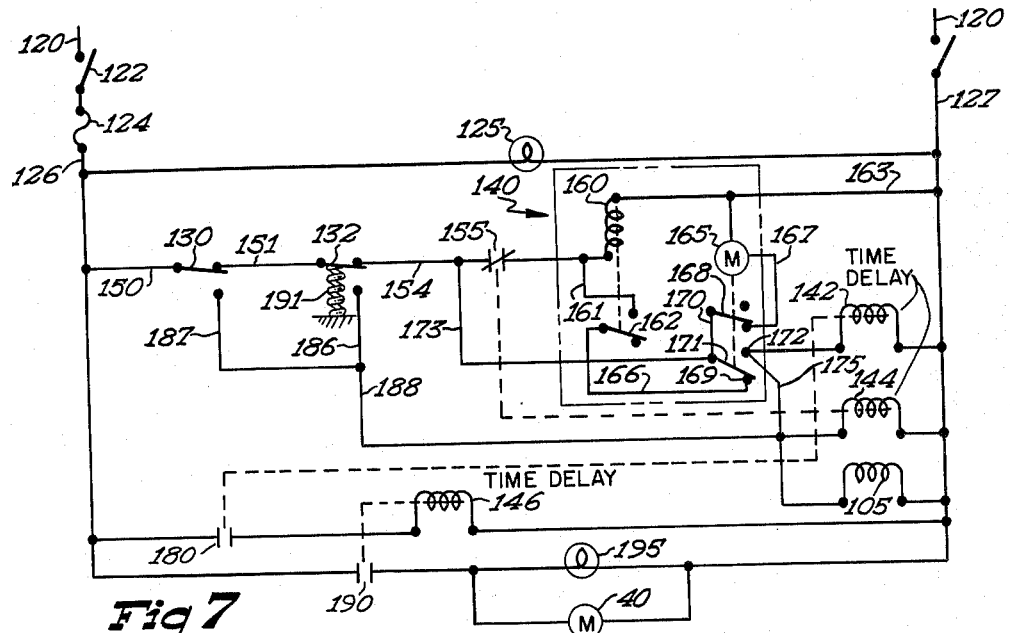
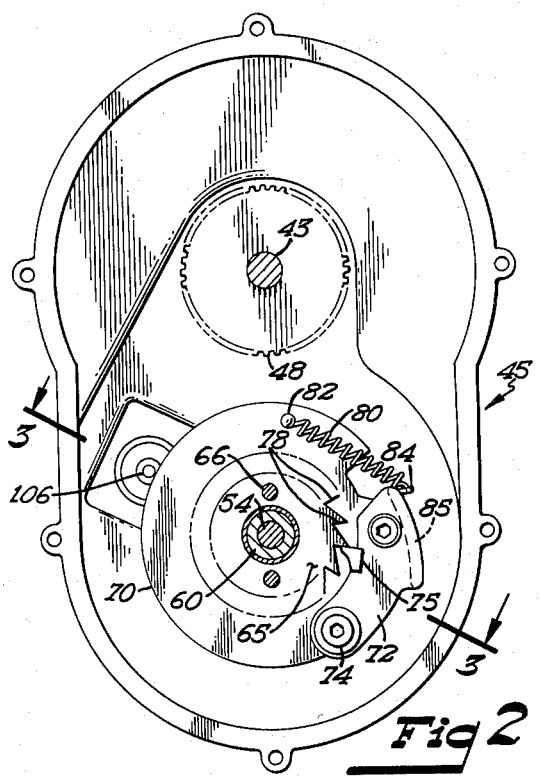
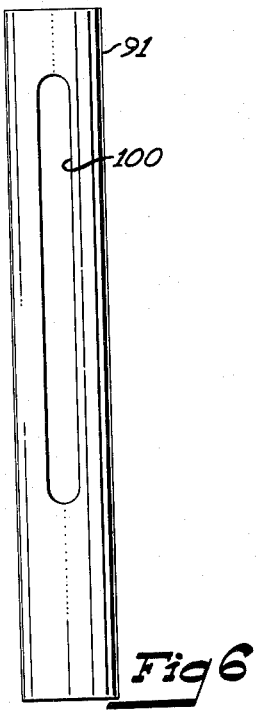
INVENTORS
WAYNE F. GUSTAFSON,
RAY R. CORDELL
BY
Schroeder & Siegfried
ATTORNEYS United States Patent Office 3,217,548
Patented Nov. 16, 1965

This invention relates to an automatic sampling device and more particularly to an improved automatic sampling device in which the amount of sample to be taken thereby is in proportion to the amount of material present from which the sample is to be taken. This improved sampling device is readily applied to conveying apparatus to provide for accurate sampling of the material being conveyed by taking a representative sample in accordance with the amount of material being conveyed.

At the present time, sampling devices of this type normally take new samples from one point only on a conveying apparatus and without regard to the amount of sample or its distribution on the conveying apparatus. Depending upon the physical size of the conveying apparatus and the flow of material being conveyed therein, a sample taken at one point may not be representative of the entire volume of material present in the conveying apparatus at any one time. The improved sampling device of the subject invention is directed to an arrangement in which an improved sampling tube is positioned across the entire path of flow through the conveying apparatus and will take a sample which varies in volume at differing points along the sampling device such as to be representative of the entire volume of flow of the material in the conveying apparatus. This improvement sampling device does not impede the flow of material being conveyed in the conveying apparatus and may readily be applied to a conveying line or in a discharge spout or chute. Further, the improved sampling device is capable of cyclic operation, continuous operation or momentary sampling provide for complete and manual control of the same. This improved sampling device utilizes a sampling tube with a varying sized sample opening therein to provide for the proportional sampling.

Therefore, it is an object of this invention to provide an improved automatic sampling device.

Another object of this invention is to provide in an improved sampling device a sampling tube having a vari-sized sample opening therein to take a sample in proportion to the volume of material being conveyed at a point in the conveying tube.

Another object of this invention is to provide in an improved sampling device an improved valving structure with the variable sized sample opening therein which does not impede the flow of material through the conveying tube.

A still further object of this invention is to provide an improved automatic sampling device in which accuracy of sampling is increased by insuring positive valve opening and positive cleanout of the sampling tube.

Another object of this invention is to provide in an improved sampling device an arrangement which permits cyclic, continuous and momentary sampling.

A further object of this invention is to provide an improved automatic sampling device with an arrangement of parts which is simple in design, economical in construction and easy to maintain.

These and other objects of this invention will become apparent from a reading of the attached description together with the drawings wherein:

FIGURE 1 is an elevation view of the improved automatic sampling device mounted on a conveying tube with parts of the device in section;

FIGURE 2 is a section view of the improved sampling device taken along the lines 2—2 of FIGURE 1;

FIGURE 3 is a sectional view of a portion of the improved automatic sampling device taken along the lines 3—3 of FIGURE 2;

FIGURE 4 is a sectional view of a portion of the sampling tube of the improved automatic sampling device;

FIGURE 5 is an elevation view of a portion of the sampling tube shown in FIGURE 4;

FIGURE 6 is an elevation view of another portion of the sampling tube shown in FIGURE 4; and FIGURE 7 is a schematic electric circuit of the improved sampling device.

The improved sampling device is shown in FIGURE 1 in connection with a conveying tube or discharge chute 10 which is shown in section. The sampling device includes basically a mounting structure indicated generally at 20 comprised of parts 21 and 22 positioned on opposite sides of the conveying tube 10. The parts 21 and 22 of the mounting structure for the sampling device secure the sampling device to a conveying tube and position a sampling tube assembly, indicated generally at 25, of the sampling device in the conveying tube, with the sampling tube extending through apertures in the conveying tube to either side of the same. The parts 21, 22 are held together in assembled relationship by bands 26 which are secured to the parts 21, 22 through suitable screw means 28 attached at the extremities of the band such that the bands encircle the conveying tube 10.

As shown in FIGURE 1, the sampling tube 25, when so mounted on the conveying tube or discharge chute, extends across the conveying tube at the center thereof with portions of the sampling tube assembly extending beyond the periphery of the conveying tube, for purposes to be later noted. The part 22 of the mounting structure includes a circular flange portion 30 defining the discharge spout of the sampling device. The part 21 includes a flange mounting section 35 on which the remaining portion of the sampling device is mounted. Each of the parts 21, 22 include bearing means 36, which, as will be later noted, serve to journal a portion of the sampling tube assembly in a manner to be hereinafter described. Mounted on the flange mounting section 35 of the mounting part 21 is a motor 40 having a gear reducing section 31 connected thereto and driving an output shaft 43. The output shaft 43 extends into a gear section or casing 45 and mounts therein a pair of drive gears 47, 48 which are suitably secured to the shaft. Gear casing 45 is connected to the flange mounting section 35 of the mounting part 21 through suitable means (not shown). Drive gear 47 on output shaft 43 cooperates with a pinion gear 52 mounted on a shaft portion 54 and secured thereon. Shaft portion 54 is an extension of a shaft of an auger 55 which is positioned in the sampling tube 25 with the flighting portion of the auger being located within sampling tube assembly 25 by a collar 58 mounted on and secured to shaft portion 54, as will be later noted.

Gear casing 45 also includes a drive gear 59 mounted on a sleeve member 60 through a sleeve bearing 61, which sleeve 60 also includes bearings 62, 63 for mounting and journalling the sleeve 60 on the shaft portion 54 of the auger 55. Associated with the drive gear 59 is a ratchet member 65, also mounted on bearing 61, which is best seen in FIGURES 1, 2 and 3. Ratchet member 65 is suitably connected to the drive gear 59 through bolts 66 to be driven thereby on the sleeve member 60 for rotation relative thereto. As will be noted in FIGURE 1 by the physical size of gearing 47, 48 and 52, 59, the ratio for gearing 47, 52 from the output shaft 43 to the auger shaft portion 54 is appreciably larger than the ratio of the gearing driving the ratchet member 65. The purpose of this difference in gear ratios or speeds of rotation of the ratchet member 65 with respect to the auger 55 will become evident as the disclosure proceeds.

Associated with the ratchet member 65 is a clutch plate 70, which, as will be seen in FIGURE 2, mounts a pivoted pawl member 72 which is pivoted on the clutch plate 70 through suitable pivot means 74. Pawl member 72 carries a pawl or detent 75 adapted to engage teeth 78 on the ratchet member 65 to provide a driving connection between the ratchet member 65 and the clutch plate 70. As will be best seen in FIGURE 2, the pawl member 72 is biased toward the ratchet member 65 through a suitable spring 80 attached at one extremity, as at 82, to the clutch plate 70 and at the other extremity, to a finger 84 of the pawl member 72. Pawl member 72 is so mounted on the clutch plate 70 such that the detent or pawl 75 overlies the teeth 78 on the ratchet member 65 and such that the pawl member 72 may be pivoted toward and away from the ratchet member 65 to provide a clutching arrangement therebetween. Clutch plate 70 is mounted on the sleeve member 60 through a press fit which in turn is connected to a portion or tube 88 of the sampling tube assembly located within the mounting flange section 35 of the mounting structure 20. Clutch plate 70 is also spaced from the flange section 35 by washer means 89 which reduces the friction of engagement of the clutch plate 70 with this portion of the mounting structure. The sleeve member 60 is connected to the tube 88 of the sampling tube assembly 25 through suitable means such as a screw, indicated at 90. Further, this portion of the tube 88 is journalled within the flange section 35 of the mounting structure 20 through suitable bearing means indicated at 92. Thus it will be seen that the tube 88 will be rotated by the clutch plate 70 and ratchet member 65 on the bearings 36 and 92 within the mounting structure 20 relative to the conveying tube 10. Further, the auger 55 is journalled within the sampling tube assembly 25 through bearings 62, 63 for rotation in a manner to be hereinafter described. Collar 58 on shaft portion 54 of the auger bears against sleeve member 60 to position the auger within sampling tube assembly 25 and a screw 93 in casing 45 bears against the end of the shaft portion 54 to locate the shaft and pinion gear 52 in the gear casing 45.

The sampling tube assembly 25 will best be seen in FIGURES 4, 5 and 6. This assembly is shown in section in FIGURE 1 with the details of the slots best seen in FIGURES 5 and 6. Assembly 25 is comprised of the outer journalled tube 88 which is connected with a clutch plate 70 through the screw 90 and journalled in the flange section 35 through the bearings 92. This outer tube, which is shown in plan view in FIGURE 5 with its slot therein, has mounted within the same an inner tube 91, shown in FIGURES 4 and 6. The inner tube 91 is designed to be stationary such that tube 88 moves relative thereto. Tube 91 extends into the spout portion 30 of the mounting part 22 and is secured therein through pins 94 which thread through suitable tapped apertures 95 in the discharge spout 30 of the mounting part 22 to secure the tube 91 therein. Mounting part 22 also includes a recessed portion 96 into which the extremity of the outer tube 88 extends to be journalled at this point through the bearing 36. The opposite extremity of tube 91 within the tube 88 extends to the vicinity of the end of the auger 55 and is spaced from the sleeve member 60 therein.

As will be seen in FIGURES 4 and 5, tube 88 has an irregular or tapered slot 97 therein extending helically along the extent of the tube. This slot 97 is formed by irregular shaped sides 98 which taper down to a narrow width and extend along the surface of a portion of the tube in the manner of two helical lines of different pitch. At the center portion 99 of the slot, these helically formed sides are off-set in an angular direction and continue helically through the other extent of the tube from the midpoint to the extremity thereof tapering down to a narrow width at the end of the slot. This slot 97 in tube 88 is designed to cooperate with an elongated slot 100 of uniform width extending along the surface of the tube 91 parallel to the axis thereof, as will best be seen in the assembled view of the tubes in FIGURE 4. Positioned within the tube 91 is the auger 55 which is designed to move material or samples introduced into the sampling tube through the combined opening between the slots 97 and 100. By rotation of the tube 88 relative to the tube 91, the slot opening between the respective tubes 97 and 100 will vary, as will be hereinafter described.

In the mounting of the sampling tube assembly 25 in the conveying tube 10, tube 91 of the sampling tube assembly 25 is normally positioned with its elongated slot 100 facing the direction of the flow of material through the conveying tube. This positioning will be fixed by virtue of the connection of the tube 91 on the mounting part 22 through the pins 94. The outer portion or tube 88 of the sampling tube 25 will have a rest position in which the slot 97 therein faces generally downstream of the flow of material through the conveying tube. Since the slot 97 in tube 88 is generally helical in form and tapers from its ends which have a narrow width to its center which has a wider width, portions of the ends of the slot 97 will be generally upstream of the axis of the tube 88 in the rest position. This will be evident by FIGURE 4 which discloses the assembled relationship of the tubes 88 and 91 in the maximum of full-open position, in which the tube 88 has been rotated 180° relative to its normal position and the tube 91 therein. In this position, the slots 100 and 97 will be facing the direction of flow of material through the conveying tube and the maximum amount of sample will go through the combined slots 97 and 100 to enter the interior of the sampling tube 25 and be moved therefrom by the auger 55 rotating within the tubes of the sampling device to be discharged at the spout 30 thereof. Thus, in the normal rest position for the tubes 88 and 91, the slots 97 and 100 therein will be out of alignment such that the tube 88 will cover the slot 100 within the tube 91 and no material will be allowed to enter the sampling device. Movement of tube 88 on the tube 91 of the assembly 25 is controlled by a clutching action provided between clutch plate 70 and ratchet wheel 65.

The clutch formed by the clutch plate 70 with the pawl member 72 thereon and the ratchet member 65 is operated by a solenoid 105 which is mounted on the gear casing 45 attached to the mounting structure 20 (see FIGURE 3). Solenoid 105 has a thrust pin 106 which extends into the gear casing 45 adjacent the clutch plate 70. The thrust pin 106 is adapted to engage or cooperate with the finger 84 on the pawl member 72 to normally hold the detent or pawl 75 out of engagement with the teeth 78 of the ratchet member 65, preventing connection between the clutch parts and eliminating or breaking the driving connection from the motor 40 through the gearing 48, 59 to the tube 88 of_the sampling tube assembly 25. As will be seen in FIGURE 2, the thrust pin 106 which is located adjacent the path of rotation of the clutch plate 70 will be engaged by the finger 84 of the pawl member 72 to urge the detent 75 out of engagement with the ratchet member 65 and provide rest position for the sampling tube assembly.

In this location or position, the sampling tube assembly will be so positioned with respect to the conveying tube 10 that an elongated slot 100 in the tube 91 which extends substantially across the interior of the conveying tube 10, will be facing upstream of the flow of material through the conveying tube 10 and tube 88 with its slot 97 will be facing downstream of the flow of material. The tube 88 with the slot 97 therein is designed to be rotated through 360° of angular rotation within the conveying tube 10 during a sampling operation and such rotation will be controlled through the clutch in accordance with the operation of the solenoid 105, as will be hereinafter described. The driving connection for the tube 88 from motor 40 will be initiated by energization of the solenoid 105 which will withdraw the thrust pin 106 into the confines of the solenoid, breaking the engagement between the pin and the finger 84 on the pawl member 72 allowing the pawl member, under the influence of the spring 80, to be urged into engagement with the ratchet teeth 78. The direction of rotation of the ratchet member, as seen in FIGURE 2, will be in a clockwise direction, causing the clutch plate 70 with the pawl member 72 thereon to be driven on sleeve member 60 to provide a driving connection or rotation to the tube 88 through the connection of the sleeve member 60 with the tube at the screw 90. This rotation will continue through 360° The energization of solenoid 105 will be such that the solenoid will be momentarily energized to deflect the thrust pin 106 allowing engagement of the clutch parts after which time the solenoid will be de-energized and the pin will return through conventional spring action (not shown) to its de-energized position where it will be in position to again engage the finger 84 on the pawl member 72 as it is rotated back into proximity with the thrust pin 106. At this point, which occurs after 360° of rotation, the engagement of the thrust pin 106 with the finger 84 of pawl member 72, causes the clutch parts to be separated by urging of the pawl member 72 out of engagement with the teeth 78 on the ratchet member 65 against the influence of the spring 80. With such disengagement of the clutch parts, the tube 88 will stop even though the motor 40 continues to rotate the ratchet member 65 and the auger 55. In normal operation, this fixed rotation of the tube 88 of the sampling tube assembly provides for a variable opening between the slots 97, 100 of tubes 88, 89 in the sampling tube assembly to pick up a sample from the conveying tube 10 after which the sampling tube assembly 25 returns to its normal or rest position and no further sample will be taken therein. The motor 40, as will be hereinafter noted, will continue to be energized for a given period to drive the auger 55 such that the sample within the sampling tube 91 will be removed therefrom through the discharge spout 30. As previously indicated, the relative speeds of rotation of the tube 88, during its single revolution of sampling movement, and the auger 55 is in a ratio of 1 to 7 insuring positive cleanout and transfer of the sample from the tube 91 through the discharge opening at all times.

The motor 40 and clutch solenoid 105 are energized through an electrical circuit shown in FIGURE 7. This circuit includes a pair of source conductors 120 representing a 115 volt 60 cycle alternating current source which has connected thereto an on-off switch 122 and fuse 124 to control the power to the electric control circuit. This control circuit beyond the switch 122 is evidenced by conductors 126, 127. A pilot light 125 is connected across these conductors to provide an indication of the application of power to the control circuit upon closure of the switch 122. The control circuit includes a pair of single throw double pole switches 130, 132 which are shown positioned in their off position and are utilized for manual operation of the sampling device.

Automatic operation of the sampling device is provided through energization and operation of an interval timer, indicated generally at 140, which timer controls the energization of a first timing relay 142 and a timing reset relay 144. The energization circuit for the interval timer 140 includes a conductor 150 connected to conductor 126 and switch 130 in the off position and extending through a conductor 151 and the off position of switch 132. This circuit is completed through a conductor 154 from switch 132 and a normally closed contact 155 of the timing reset relay 144 to a relay coil 160 of timer 140, which in turn is connected to a conductor 163 and the opposite side of the source of power evidenced by conductor 127. Timer 140 also includes a timing motor 165 which is connected to the conductor 163 and a conductor 167 leading to a first switch 168 operated by timing motor 165. Switch 168 is of a normally closed type and is operated by the timing motor 165, as will be hereinafter noted, to control the energization circuit for the timing motor 165. The energizing circuit for the timing motor 165 extends from switch 168 through a conductor 170 and a conductor 173 connected to the conductor 154 leading through the switches 130, 132 to the opposite side of the power source or conductor 126. The timer 140 also includes a holding switch 162 operated by the relay coil 160, which switch provides a by-pass circuit around the contact 155. This bypass circuit includes a conductor 161 attached to the relay coil 160 and a conductor 166 leading to a normally closed contact 169 of a second switch 171 driven by timing motor 165 and through the conductor 173 to the conductor 154 bypassing the normally closed contact 155. Switch 171 includes a normally open contact 172 which is connected to the timing relay 142 and through a conductor 175 to the reset relay 144 and the clutch solenoid 105. The opposite extremities of each of these relays and the solenoid are connected to the supply conductor 127.

The reset relay 144 is a timing relay having time delay on closing and time delay on opening that is effective to reset the timing motor 165 and relay coil 160 of the interval timer 140. The timing relay 142 has associated therewith a normally open contact 180 which connects the supply conductor 126 to a motor relay coil 146, whose opposite side is connected to the supply conductor 127. Motor relay 146 is of the time delay type and includes a normally open contact 190 which connects the supply conductor 126 to the motor 40 with the opposite side of the motor being connected to the supply conductor 127. Connected in parallel with motor 40 is an indicating light 195 which indicates energization of the motor 40 and operation of the sampling device.

In operation, the improved sampling device has a continuous or automatic timed cycle or mode of operation as well as two manual modes of operation. In the normal or automatic mode of operation, the timer 140 controls the energization and operation of the motor 40 and clutch solenoid 105 for operation or rotation of the tube 88 of the tube and the auger 55 therein. This circuit is completed from the supply conductor 126 through the off position of the switches 130, 132, the conductors 150, 151 and 154 to the timer 140. The relay coil 160 of the timer is energized through the normally closed contact 155 of the timing reset relay 144 and the timing motor 165 is energized through a circuit which includes conductors 173, 170, switch 168 in the off or closed position, and conductor 167 connecting timing motor 165 and conductor 163 to the supply conductor 127. Thus the timing motor 165 and relay coil 160 will be energized with the relay coil 160 operating immediately to set up the holding circuit through its switch 162. The switches 168 and 171 of timing motor 165 are of the type which do not close immediately but are operated from their normally closed to their normally open positions after a predetermined time cycle of operation of timing motor 165. This interval timer is of the type which can be set manually for adjustable time cycles, the timing operation being determined by the operation of the motor through a suitable connection (not shown) in the operation of the switches 168 and 171. At the end of the timing sequence of the timing motor 165, switches 168, 171 will operate and with such operation, the energizing circuit for the motor 165 will be broken at the switch 168. Similarly, the operation of switch 171 will provide an energizing circuit through the switch at its normally open contact 172 to the timing relay coil 142, the timing reset coil 144 and the clutch solenoid 105. The timing relay 142 has its normally open contact 180 closed at this time energizing the motor relay coil 146. Both the relays 142 and 146 are of the time delay type with a time delay provision being either fixed or adjustable and providing delay on opening after de-energization of the coil. Thus the motor relay coil 146 will be immediately energized and through its contact 190 will energize the motor 40 simultaneously with the energization of the clutch solenoid 105. With the end of the timing cycle of the timing motor 165 and operation of the clutch solenoid 105 and motor 40, the reset relay 144 will also be energized. This relay has time delay provision on closing and opening with a very short time delay upon closing which provides for opening of the normally closed contact 155 insuring de-energization of the relay coil 160. The de-energization of the timing motor 165 will effect a reset of the timer 140 in which the switches are restored to the normal position, as shown in the drawing, to start another timing sequence. During this period of time, the relay contact 180 of timing relay 142 will be closed as will the relay contact 190 of the motor relay coil 146. The motor 40 will be energized and the solenoid 105 will have been momentarily energized and returned to the de-energized position with the recycling of the motor switch 171 of the timer 140. This operation of the clutch solenoid 105 will allow engagement of the pawl member 72 with the ratchet member 65 to provide the driving connection from the gear train including gears 48 and 59 from the shaft 43 to cause rotation of the tube 88. This rotation will continue through the 360° rotation of the sampling tube until the original or starting position is reached. Clutch solenoid 105 in its de-energized position at this point through its trust pin 106 will disengage the pawl member 72 from ratchet member 65 breaking the driving or clutching connection between the gear train and the tube 88 to stop the sampling tube assembly in its normal position. During this period of time, the motor 40 will remain energized due to the time delay aspect of the relays 142 and 146. The relay 142 will be de-energized with the recycling of the timer 140, but it will have sufficient time delay on drop-out to maintain relay coil 146 energized for a predetermined period. With the de-energization of the relay coil 146, its contacts will have a further time delay on dropout such that the contact 190 will remain closed and the motor energized. This normal timing sequence will extend beyond the rotation of the sampling tube through its sampling cycle or 360° of rotation. The auger 55 will also be rotated at a relatively higher speed of rotation than that of the tube 88 causing cleanout of the sample therefrom. This higher speed of rotation of auger 55 will continue beyond the de-clutching of the sampling tube assembly from the motor insuring positive cleanout of the sample from the sampling tube assembly 25 through the discharge spout 30 until the time delay relay coil 146 opens its contact 190 de-energizing the motor 40. Light 195, which is connected in a parallel circuit with the motor 40, will indicate the operation of the motor 40 during this period.

The manually initiated modes of operation of the sampling device as controlled by the switches 130 and 132 are provided through conductors 187 and 186 connected to the off positions of each of the switches and through a conductor 188 to the conductor 175 leading to the clutch solenoid 105 and the timing relay 142. In the first of these modes of operation, the switch 130 will be moved from its normally closed or off position to its normally open position providing a circuit from the supply conductor 126 through the conductor 150 and switch 130 to the conductor 187, to the conductor 188 and the clutch solenoid 105 which is connected to the supply conductor 127. In parallel with this circuit is the conductor 175 and timing relay 142 which is also connected to the supply conductor 127. In addition, the timing reset relay 144 is included in this circuit, but since its contact 155 is effective only in controlling the energization of the timer 140, which under these conditions is isolated by operation of the switch 130 to its on position, the operation of the contact 155 will have no effect. With the operation of the clutch solenoid 105, the tube 88 will be connected to the driving motor 40 through the clutch formed by clutch plate 70 and ratchet member 65. Simultaneously, therewith, the energization of the relay 142 will operate through its contact 180 to energize the relay coil 146 which in turn controls the energization of the motor 40. As long as the continuous switch is held in its on position, the timer 140 will be isolated from this energizing circuit and the tube 88 will continue to be rotated by the motor 40, which will also drive the auger 55 continuously. This is a continuous sampling condition in which the tube 88 is rotated and the sample is picked up by the sampling tube assembly 25 during each revolution and discharged through the discharge spout 30 in the sampling tube assembly through operation of the auger 55. The continuous energization of the clutch solenoid 105 will maintain the pin 106 thereof out of engagement with the pawl member 72 so that the driving connection to the tube 88 will be maintained. This mode of operation will continue until the continuous switch is moved to the off position, at which time the clutch solenoid 105 will be de-energized allowing the tube 88 to rotate back to its original rest position and the motor 40 to continue operation of the auger through the time delay provision of relays 142 and 146 until after the sampling tube assembly 25 has reached its rest position and the sample therein has been removed therefrom.

The third mode of operation is that of a manual instantaneous type, and the switch 132 is shown with a spring 191 associated therewith to indicate that it will be moved from the normally closed to normally open position momentarily and return to the off position when the switch is released. The initiation of this circuit by deflection of the switch 132 will energize the clutch solenoid 105 and motor 40 to cause rotation of the tube 88 and the auger 55. Upon release of the switch 132, the timing sequence from the coils 142 and 146 will allow the motor 40 to rotate after the clutch solenoid has been de-energized and the thrust pin 106 thereon engages the finger 84 of the pawl member 72 to disengage the clutch parts 70 and 65. The energization circuit for the relays 142 and 146, as well as the clutch solenoid 105 and the motor 40, is the same as that for continuous operation and the only difference between the modes of operation is the operation of the manual momentary switch 132.

The improved sampling tube assembly 25 which is operated by rotation of the tube 88 provides for proportional opening of a sample opening defined by its slots 97, 100 within the sampling tube assembly and along the extent of the same. As will be seen in FIGURE 1, the sampling tube assembly extends across the center of the conveying tube and the flow through the conveying tube relative to the sample opening varies in volume with respect to points along the sampling tube assembly because of the curvature of the cylindrical conveying tube. In order that a more representative sample may be taken along the sampling tube assembly, the present invention provides for variably opening the combined slot or sample opening in the sampling tube assembly along the extent of the same generally in proportion to the volume of the material flowing through the conveying tube adjacent the sample opening in the sampling tube assembly. The improved sampling tube assembly provides for a variable and helically shaped slot in the tube 88 which cooperates with a fixed elongated slot in the tube 91, both of which slots extend substantially across the internal dimension of the conveying tube. The slot 97 in tube 88 is tapered or narrow at its extremities and widens to a maximum at its mid-point such that as the tube 88 is rotated relative to the tube 91, the slots therebetween will be open longer as tube 88 rotates about tube 91 and the degree of opening between the slots is increased. This will provide a greater proportion of sample to be picked up at the mid-point of the conveying tube where the largest volume of material flows relative to the sampling tube than at the extremities thereof wherein the volume of conveyed material relative to the sampling tube assembly is small. The slot formed in the tube 88 is generally helical in form and is offset at the center to increase the size of the opening of the slot at the center thereof and to insure that the ends of the slots do not extend into the area of the normal rest position for the tube 88. The volume of the sample picked up by the sampling tube assembly is determined by the relative positioning of the slots 100 and 97 in the tubes 91 and 88 and the tube 88 is rotated on the tube 91 to provide a variable opening valve function which advances along the extent of the tube to reach a maximum valve opening size at the mid-point of the tube and decrease toward the ends thereof. This operation of the improved sampling tube assembly will take place cyclically as controlled by the timer 140 such that samples of material being conveyed will be picked up along the extent of the sampling tube assembly in varying amounts and proportioned to the amount of material flow past the sampling tube assembly. The continuous cyclically operation of the sampling tube assembly is controlled by the electrical circuit described above which may also provide for continuous operation as previously described or manual instantaneous operation for spot sampling.

In this improved automatic sampling device, the electric motor 40 operates the sampling tube assembly 25 through a given cycle of rotation similar to a valving operation for the collection of a sample from the conveying tube 10. This sampling cycle is controlled and related to the cleanout cycle or operation of the auger such that positive cleanout of the sampling tube assembly is insured. The improved apparatus requires no special modification of the conveying tube 10 and the sampling tube assembly 25 and the type of valve operation described provides no impedance to flow of the conveyed material through the conveying tube 10. Further, the mechanical arrangement of driving the tube 88 from the motor 40 insures that the sampling tube assembly will always remain in the fixed rest position and rotate through a given angular rotation in the sampling operation. This provides for uniformity and accuracy in sampling.

In considering this invention, it should be remembered that the present disclosure is intended to be illustrative only and the scope of the invention should be determined only by the appended claims.

We claim:

1. A sampling device comprising, a sampling tube adapted to be positioned in a conveying tube, means including said sampling tube forming a hollow valve means having a valve opening on its surface exposed to the flow of material in the conveying tube which is variable in size at points along the extent of said tube, and means connected to said valve means for operating the valve means such that the size of said valve opening varies in proportion to the volume of flow of the material at said points in the conveying tube with the material passing through the variably sized valve opening to the interior of the hollow valve means for delivery therefrom.

2. The sampling device of claim 1 and including auger means positioned within the sampling tube and connected to the valve operating means such that said auger operates simultaneously with said valve means.

3. The sampling device of claim 2 in which the operation of the valve means in said sampling tube occurs in a sequence which starts with a condition of no valve opening and extends through a condition of variable opening of the valve and ends with a condition of no valve opening.

4. The sampling device of claim 3 and including timing means connected to said valve operating means and said auger for cyclically operating the same simultaneously.

5. A sampling device comprising, a sampling tube adapted to be positioned in a conveying tube having a granular material flowing therein, said sampling tube extending across said conveying tube and including a pair of concentrically mounted tube means forming a valve, one of said tube means having a fixed slot therein and the other of said tube means having a variable sized slot therein which varies in size being larger at the midpoint of the tube means than at the extremities of the tube means, means for mounting said sampling tube in a conveying tube such that the openings in the tube means extend across the conveying tube and journalling one of said tube means, one of said tube means being positioned such that the slot therein is positioned facing the direction of flow of material through said conveying tube and the other of said tube means has its slot therein positioned downstream of the direction of flow of material in said conveying tube, and rotating means connected to one of said tube means to rotate the same relative to the other of said tube means to open a avariable sized sample opening defined by said slots in said sampling tube which sample opening varies in proportion to the volume of flow of the material in the conveying tube aligned with the sample opening in the sampling tube.

6. The sampling device of claim 5 and including auger means positioned within the tube means of said sampling tube and connected to said rotating means for rotation simultaneously with the rotation of said one of said tube means.

7. The sampling device of claim 6 in which the variable sized slot in the other of said tube means is positioned helically in the other of said tube means.

8. The sampling device of claim 7 in which the variable sized slot in the other of said tube means is defined generally by helices of different pitch.

9. A sampling device comprising, a sampling tube, means mounting said sampling tube and adapted to be positioned in a conveying tube such that said sampling tube extends therethrough, means including said sampling tube forming a valve means and having a valve opening therein exposed to the flow of material in the conveying tube which opening varies in size at points along the extent of said conveying tube, an auger positioned in said sampling tube and journalled therein, a motor mounted on said mounting means and connected to said auger to rotate said auger in said sampling tube, means connecting said motor to the valve means of said sampling tube for operating the valve means such that the size of said opening varies in proportion to the volume flow of material at said points in said conveying tube, and control circuit means connected to said motor for energizing the same.

10. The sampling device of claim 8 in which the operation of the valve means from said motor occurs in a sequence which starts with a condition of no valve opening and extends through a condition of variable opening of the valve means and ends with a condition of no valve opening of said valve means and in which said control circuit means includes timing means to cyclically operate said auger and said valve means.

11. The sampling device of claim 9 in which the valve means in said sampling tube is comprised of a pair of concentrically mounted tube means forming a part of said sampling tube in which one of said tube means has a straight slot therein and the other of said tube means has an opening along the extent of the same which varies in size being larger at midpoint the tube means than at the extremities of said tube means, and in which the concentrically mounted tube means of said sampling tube are positioned so that the openings therein are positioned with one opening facing the direction of flow of material through the conveying tube and the other opening facing to the direction of flow of said material and with said means connecting said valve means to said motor being a selectively operated coupling of one of said tube means with said motor to rotate said one of said tube means relative to the other of said tube means.

References Cited by the Examiner

UNITED STATES PATENTS

| | | | |
|---|---|---|---|
| 1,108,278 | 8/1914 | Thomas | 73—422 |
| 2,164,498 | 6/1939 | Clark | 73—424 |
| 3,060,746 | 10/1962 | Gompper | 73—422 |

LOUIS R. PRINCE, *Primary Examiner.*

RICHARD QUEISSER, *Examiner.*